United States Patent
Ross et al.

(10) Patent No.: US 9,926,473 B2
(45) Date of Patent: Mar. 27, 2018

(54) FLAME RETARDANT, PRESSURE-SENSITIVE ADHESIVE, AND CURABLE COMPOSITION

(71) Applicant: 3M INNOVATIVE PROPERTIES COMPANY, St. Paul, MN (US)

(72) Inventors: Richard B. Ross, Cottage Grove, MN (US); Larry D. Boardman, Woodbury, MN (US); Eumi Pyun, Austin, TX (US); Anthony R. Plepys, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 19 days.

(21) Appl. No.: 15/128,540

(22) PCT Filed: Mar. 20, 2015

(86) PCT No.: PCT/US2015/021816
§ 371 (c)(1),
(2) Date: Sep. 23, 2016

(87) PCT Pub. No.: WO2015/148314
PCT Pub. Date: Oct. 1, 2015

(65) Prior Publication Data
US 2017/0174954 A1    Jun. 22, 2017

Related U.S. Application Data

(60) Provisional application No. 61/970,037, filed on Mar. 25, 2014.

(51) Int. Cl.
| | | |
|---|---|---|
| *C08K 5/00* | (2006.01) | |
| *C09J 11/06* | (2006.01) | |
| *C08K 5/521* | (2006.01) | |
| *C09J 133/04* | (2006.01) | |
| *C09J 109/00* | (2006.01) | |

(52) U.S. Cl.
CPC ............... *C09J 11/06* (2013.01); *C08K 5/521* (2013.01); *C09J 109/00* (2013.01); *C09J 133/04* (2013.01)

(58) Field of Classification Search
CPC ......... C08K 5/521; C09J 11/06; C09J 109/00; C09J 133/04
See application file for complete search history.

(56) References Cited

U.S. PATENT DOCUMENTS

| | | | |
|---|---|---|---|
| 2,532,011 A | 11/1950 | Dahlquist | |
| 5,209,971 A | 5/1993 | Babu | |
| 5,296,547 A | 3/1994 | Nestegard | |
| 5,393,787 A | 2/1995 | Nestegard | |
| 5,851,663 A | 12/1998 | Parsons | |
| 6,277,488 B1 | 8/2001 | Kobe | |
| 6,503,621 B1 | 1/2003 | Ma | |
| 6,630,238 B2 | 10/2003 | Hyde | |
| 7,166,686 B2 | 1/2007 | Olson | |
| 8,551,616 B2 | 10/2013 | Joseph | |
| 2003/0021989 A1 | 1/2003 | Zhou | |
| 2011/0178250 A1 | 7/2011 | Steelman | |
| 2013/0236718 A1* | 9/2013 | Buettner | ................ C09J 7/0246 428/317.3 |

FOREIGN PATENT DOCUMENTS

| | | |
|---|---|---|
| JP | 53-40092 | 4/1978 |
| JP | 55-133388 | 10/1980 |
| JP | 56-087588 | 7/1981 |
| JP | 11-236453 | 8/1999 |
| JP | 2006-219565 | 8/2006 |
| WO | 91-17987 | 11/1991 |
| WO | 2010-077493 | 7/2010 |
| WO | 2012-129362 | 9/2012 |
| WO | 2012-129366 | 9/2012 |

OTHER PUBLICATIONS

Chu, M.; Coates, R.M. J. Org. Chem. 1992, 57, 4590-4597.*
Chu, "Partial synthesis of 9,10-Syn Diterpenes via Tosylhydrazone Reduction: (-)-(9β)-Pimara-7,15-diene and (-)-(9β)-Isopimaradiene", The Journal of Organic Chemistry, 1992, vol. 57, No. 17, pp. 4590-4597.
Donker, "The Chemistry of Tackifying Resins", Pressure Sensitive Tape Council, 2001, pp. 149-163.
Ro, "Loblolly pine abietadienol/abietadienal oxidase PtAO (CYP720B1) is a multifunctional, multisubstrate cytochrome P450 monooxygenase", Proceedings of the National Academy of Sciences, 2005, vol. 102, No. 22, pp. 8060-8065.
Winkler, "The role of quantitative structure-activity relationships (QSAR) in biomolecular discovery", Briefings in BioInformatics, 2002, vol. 3, No. 1, pp. 73-86.

(Continued)

*Primary Examiner* — Rip A Lee
(74) *Attorney, Agent, or Firm* — Bradford B. Wright

(57) ABSTRACT

Flame retardant tackifiers are represented by the formula ' wherein R represents a hydrocarbyl group having 20 carbons and three consecutive fused six-membered rings; and each $R^2$ independently represents an alkyl group having from 1 to 8 carbon atoms. Curable compositions contain a curable binder precursor and at least one of the flame resistant tackifiers. Pressure-sensitive adhesives comprises an elastomer and at least one flame retardant tackifier compound represented by the formula " wherein R represents a hydrocarbyl group having 20 carbon atoms and three consecutive fused six-membered rings and each $R^1$ independently represents an alkyl or aryl group having from 1 to 8 carbon atoms.

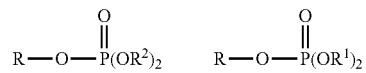

16 Claims, No Drawings

(56) References Cited

OTHER PUBLICATIONS

Product Data Sheet, "3M Scotchcast Electrical Insulating Resin 4", 3M Company, Electrical Markets Division, Austin, Texas, Oct. 2013.
International Search Report for PCT International Application No. PCT/US2015/021816, dated Jun. 10, 2015, 4 pages.

* cited by examiner

FLAME RETARDANT, PRESSURE-SENSITIVE ADHESIVE, AND CURABLE COMPOSITION

BACKGROUND

Thermosetting adhesives and pressure-sensitive adhesives are used in a variety of applications with elevated fire/flame risk (e.g., aircraft, cars, trains, ships, electrical wiring, and electronics). These adhesives are typically combustible and/or flammable unless one or more flame retardant is added to reduce the fire/flame risk.

Flame retardants may reduce the flammability of materials by one or more of a variety of mechanisms including, for example, quenching free radicals in the gas phase, reacting with chemical fragments from the burning material to initiate char formation, and forming barrier layers within the burning material.

Commonly used flame retardants include halogenated compounds such as polychlorinated biphenyl and polybrominated diphenyl ethers. These flame retardants are well-known and very efficient at fire retardation in combustible materials. However, many compounds in this class of flame retardants are considered hazardous substances. Several of the most effective halogenated flame retardants have been banned by the European Union under the Restriction of Hazardous Substances (RoHS) since Jul. 1, 2006. Several Asian countries and individual states in the United States are also following with similar RoHS directives. In addition, an increasing number of end-product manufacturers are establishing policies to refuse to use halogenated flame retardant materials in their products. Accordingly, there is a continuing need for new halogen-free flame retardants.

SUMMARY

Additives such as flame retardants are commonly added to pressure-sensitive adhesive compositions in substantial amounts that may degrade adhesive properties. For example, 30 percent by weight or more weight percent of the flame retardant compound may need to be added in order to obtain the required level of flame retardancy. This high level of flame retardant compound often negatively impacts the adhesive properties. The difficulties can be further amplified in pressure-sensitive adhesive formulations which include a large amount of tackifier.

Advantageously, the present disclosure provides flame retardant compounds that may also serve as tackifiers in pressure-sensitive adhesive compositions. Combining the tackifier and flame retardant functionality into one additive compound reduces the overall amount of additive required thereby reducing or eliminating adverse impact on pressure-sensitive adhesive properties due to the presence of additive(s).

Accordingly, in one aspect the present disclosure provides a pressure-sensitive adhesive composition comprising:
  an elastomer; and
  at least one flame retardant tackifier compound represented by

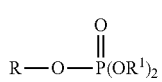
(Formula I)

wherein
  R represents a hydrocarbyl group having 20 carbon atoms and three consecutive fused six-membered rings; and
  each $R^1$ independently represents an alkyl or aryl group having from 1 to 8 carbon atoms.

In another aspect, the present disclosure provides a flame retardant tackifier represented by

(Formula II)

wherein
  R is as previously defined; and
  each $R^2$ independently represents an alkyl group having from 1 to 8 carbon atoms.

In yet another aspect, the present disclosure provides a curable composition comprising:
  a curable binder precursor; and
  a flame retardant tackifier represented by Formula II.

As used herein, the term "pressure-sensitive adhesive" (PSA) is defined, according to the Pressure-Sensitive Tape Council, as an adhesive including the following: (1) aggressive and permanent tack, (2) adherence with no more than finger pressure, (3) sufficient ability to hold onto an adherend, and (4) sufficient cohesive strength to be removed cleanly from the adherend.

As used herein, the term "(meth)acryl" refers to acryl and/or methacryl.

Features and advantages of the present disclosure will be further understood upon consideration of the detailed description as well as the appended claims.

DETAILED DESCRIPTION

PSAs according to the present disclosure may comprise at least one elastomer, typically in an amount of from about 25 to about 98 percent by weight of the total weight of the PSA composition. Preferably, the elastomer(s) comprise from 50 to 98 percent by weight, more preferably 75 to 98 percent by weight, based on the total weight of the PSA composition.

Useful elastomers typically form one phase at about 21° C., and have a glass transition temperature of less than about 20° C. (preferably less than or equal to 20° C., 10° C., 0° C., −10° C., or even less than or equal to −20° C.) in addition to exhibiting elastomeric properties. Examples of conventional elastomers that are useful in the present disclosure include, but are not limited to, natural and synthetic rubbers, acrylic elastomers, polyurethane elastomers, poly(a-olefin) elastomers, silicone elastomers, and ethylene/vinyl acetate copolymer elastomers.

Natural rubber elastomers useful for formulation as PSAs generally contain masticated natural rubber. Natural rubber may range in grade from a light pale crepe grade to a darker ribbed smoked sheet grade. Representative examples include CV-60 from Goodyear Tire and Rubber Co.; Akron, Ohio, which is a controlled viscosity rubber grade, and SMR-5 from Cargill Inc.; Ontario, N.Y., which is a ribbed smoked sheet rubber grade. Natural rubbers are generally non-tacky and are, therefore, typically formulated with one or more tackifying resins (i.e., tackifiers) to form PSAs. Other additives, such as antioxidants, are also frequently added to PSA formulations based on natural rubbers.

Useful synthetic rubbers may be either tacky or non-tacky. Synthetic rubber elastomers include, for example, butyl rubber (a copolymer of isobutylene and less than about three weight percent isoprene); polyisobutylene; polyisoprene; polybutadiene; and styrene/butadiene rubber. Polyvinyl ether elastomers are generally employed as blends of homopolymers of different vinyl ethers (e.g., vinyl methyl ether, vinyl ethyl ether, or vinyl isobutyl ether), or blends of homopolymers of vinyl ethers and copolymers (i.e., those polymers derived from at least two chemically different monomers) of vinyl ethers, such as, for example, with (meth)acrylates. Depending upon the degree of polymerization, the homopolymers may be viscous oils, tacky soft resins, or rubber-like substances. Polyvinyl ether elastomers include, for example, those based on vinyl methyl ether, such as LUTANOL M 40, available from BASF Corp.; Mount Olive, N.J., and GANTREZ M 574 and GANTREZ M 555, available from ISP Technologies, Inc.; Wayne, N.J.; vinyl ethyl ether, such as LUTANOL A 25, LUTANOL A 50, and LUTANOL A 100, available from BASF Corp.; vinyl isobutyl ether such as LUTANOL 130, LUTANOL 160, LUTANOL IC, LUTANOL I 60D, and LUTANOL I 65D, available from BASF Corp.; and a terpolymer of methacrylate/vinyl isobutyl ether/acrylic acid, such as ACRONAL 550 D, available from BASF Corp.

Acrylic elastomers generally have a glass transition temperature of about −20° C. or less. Frequently, these elastomers are copolymers and may comprise, for example, from about 80 to about 100 weight percent of a $C_3$-$C_{12}$ alkyl ester component such as, for example, isooctyl acrylate, 2-ethylhexyl acrylate, and/or n-butyl acrylate, and from about 0 to about 20 weight percent of a polar component, such as, for example, (meth)acrylic acid, ethylene vinyl acetate, N-vinylpyrrolidone, and/or styrene macromer. Acrylic elastomers may be tacky or non-tacky.

A representative example of a useful polyurethane elastomer is polyoctadecyl carbamate, which is described in U.S. Pat. No. 2,532,011 (Dahlquist et al.).

Poly(α-olefin) elastomers, also referred to as poly(1-alkene) elastomers, can be any suitable poly(α-olefin), so long as the material has elastomeric properties. Generally, such elastomers comprise an uncrosslinked polymer, which may have radiation activatable functional groups grafted thereon as described in U.S. Pat. No. 5,209,971 (Babu et al.). The poly(α-olefin) elastomer may be tacky or non-tacky. In addition, the polymer generally is predominantly amorphous. Useful poly(α-olefin) elastomers include, for example, $C_3$-$C_{18}$ poly(1-alkene) homopolymers and copolymers of propylene with $C_5$-$C_{12}$ 1-alkenes. Preferred poly (α-olefin) elastomers include, for example, $C_5$-$C_{12}$ poly(1-alkene) polymers and copolymers of propylene with $C_6$-$C_8$ 1-alkenes. Polyolefin thermoplastic elastomers are available, for example, from DuPont-Dow Elastomers; Wilmington, Del. under the trade designation ENGAGE. Specific examples thereof include ENGAGE 8150, ENGAGE 8180, ENGAGE 8100, ENGAGE 8452, ENGAGE 8445, ENGAGE 8480, ENGAGE 8490, ENGAGE 8200, and ENGAGE 8840.

Silicone elastomers are typically polydimethylsiloxane or polydiphenylsiloxane polymers that contain residual silanol functionality (SiOH) on the ends of the polymer chain or block copolymers comprising polydiorganosiloxane segments and urea-terminated segments.

Thermoplastic elastomers generally exhibit elastomeric properties at room temperature (e.g., about 21° C.), but exhibit thermoplastic properties at elevated temperatures at which they can be molded. Representative examples thereof include styrenic block copolymers (such as styrene-diene block copolymers), polyolefins, polyurethanes, polyesters, and combinations thereof.

Styrene-diene block copolymer elastomers are generally of the A-B or [A-B]$_n$ type, where A represents a thermoplastic polystyrene-diene block and B represents a rubbery block of polyisoprene, polybutadiene, or one of their hydrogenated versions, such as poly(ethylene-butylene) or poly (ethylene-propylene). Examples of specific styrene-diene block copolymers include, but are not limited to, linear, radial, and tapered styrene-isoprene block copolymers, such as KRATON D 1107, available from Shell Chemical Co., Houston, Tex.; EUROPRENE SOL TE 9110, available from EniChem Elastomers Americas, Inc., Houston, Tex.; linear styrene-(ethylene-butylene) block copolymers, such as KRATON G1657, available from Shell Chemical Co.; linear styrene-(ethylene/propylene) block copolymers, such as KRATON G 1750X, available from Shell Chemical Co.; butadiene block copolymers, such as KRATON D 1118, available from Shell Chemical Co.; EUROPRENE SOL TE 6205, available from EniChem Elastomers Americas, Inc.; and radial asymmetric styrene-isoprene block copolymers as described in U.S. Pat. No. 5,393,787 (Nestegard et al.) and U.S. Pat. No. 5,296,547 (Nestegard et al.). The polystyrene-diene blocks tend to form domains in the shape of spheroids, cylinders, or lamellae that cause the block copolymer to have two phases.

Flame retardant tackifier compound useful in pressure-sensitive adhesive compositions according to the present disclosure may be represented by Formula I (reproduced below for reference)

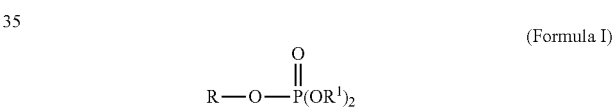

(Formula I)

R represents a hydrocarbyl group having 20 carbon atoms (i.e., a diterpenoid) and three consecutive fused six-membered rings. Examples of suitable monovalent R- groups (throughout, "Me" is used as an abbreviation for a methyl group) are listed below.

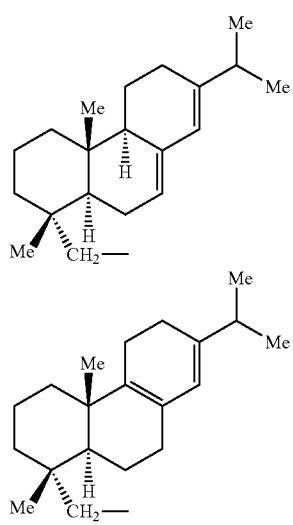

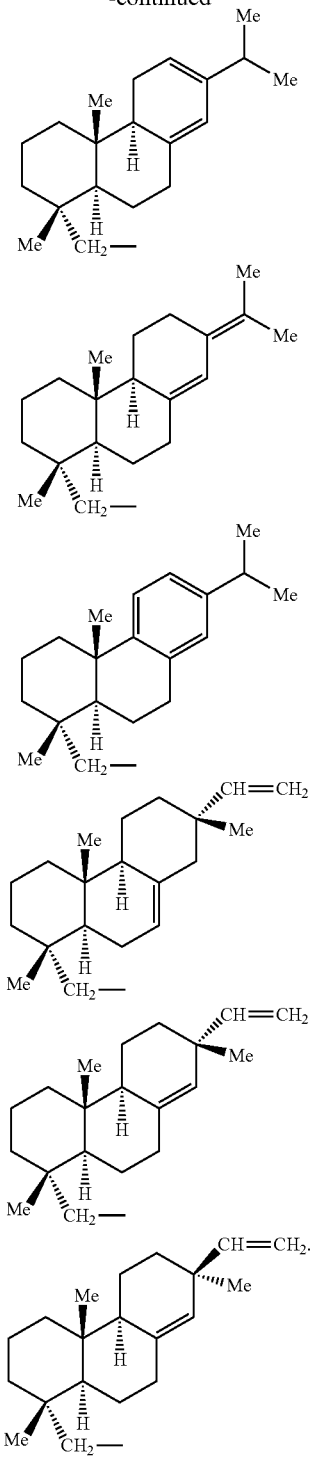

Each $R^1$ independently represents an alkyl or aryl group having from 1 to 8 carbon atoms, preferably phenyl or an alkyl group having from 1 to 6 carbon atoms, more preferably an alkyl group having from 1 to 4 carbon atoms. Exemplary groups $R^1$ include phenyl, tolyl, xylyl, ethylphenyl, methyl, ethyl, propyl, isopropyl, butyl, pentyl, cyclopentyl, hexyl, cyclohexyl, heptyl, methylcyclohexyl, octyl, and isooctyl.

In some embodiments, the flame retardant tackifier is represented by Formula 2 (reproduced below for reference)

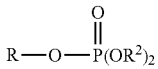

(Formula II)

wherein R is as previously described.

Each $R^2$ independently represents an alkyl or aryl group having from 1 to 8 carbon atoms, preferably phenyl or an alkyl group having from 1 to 6 carbon atoms, more preferably an alkyl group having from 1 to 4 carbon atoms. Exemplary groups $R^2$ include phenyl, tolyl, xylyl, ethylphenyl, methyl, ethyl, propyl, isopropyl, butyl, pentyl, cyclopentyl, hexyl, cyclohexyl, heptyl, methylcyclohexyl, octyl, and isooctyl.

Exemplary flame retardant tackifiers according to Formula II include

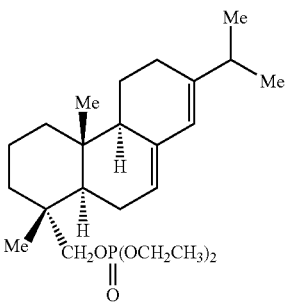

and

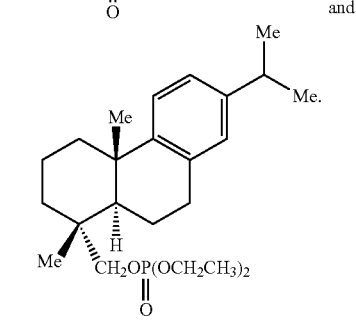

If desired, additional tackifier(s) (i.e., other that the flame retardant tackifiers according to the present disclosure) may be included in the PSA composition. Useful tackifiers include rosin and rosin derivatives, polyterpenes, coumarone indenes, hydrogenated resins, and hydrocarbon resins. Examples include α-pinene-based resins, β-pinene-based resins, limonene-based resins, piperylene-based hydrocarbon resins, polyterpene and aromatic modified polyterpene resins, aromatic modified piperylene-based hydrocarbon resins, aromatic modified dicyclopentadiene-based hydrocarbon resins, and aromatic modified co-terpene and terterpene resins.

If desired, additional flame retardant(s) (i.e., other that the flame retardant tackifiers according to the present disclosure) may be included in the PSA composition. Examples include bisphenol A bis(diphenyl phosphate) such as REOFOS BAPP available from Chemtura Corporation, Middlebury, Conn.; BDP available from Jiangsu Yoke Technology Co. Ltd., Shanghai, China; resorcinol bis-(diphenyl phosphate) also known as RDP such as REOFOS RDP available from Chemtura Corporation; RDP available from Jiangsu Yoke Technology Co. Ltd., Shanghai, China; and FYROL-FLEX RDP and many additional flame retardants available from Imperial Chemical Industries, London, England.

Other materials can be added for special purposes, including, for example, optionally, flame retardant PSA compositions useful in practice of the present disclosure may include one or more additional additives such as antioxidants, oils, plasticizers, antioxidants, ultraviolet ("UV") stabilizers, pigments, glass or polymeric bubbles or beads (which may be expanded or unexpanded), fibers, reinforcing agents, hydrophobic and hydrophilic silica, toughening agents, finely ground polymeric particles such as polyester, nylon, and polypropylene, and stabilizers. These additives are preferably added in amounts sufficient to obtain the desired end-use properties.

Preferably, flame retardant PSA compositions according to the present disclosure are substantially free of additional tackifier and/or flame retardants, although this is not a requirement.

Advantageously, flame retardant tackifiers according to the present disclosure combine the tackifier and flame retardant functionality into one additive compound reduces the overall amount of additive required thereby reducing or eliminating adverse impact on pressure-sensitive adhesive properties due to the presence of additive(s). Accordingly, in some embodiments the total combined amount of the flame retardant tackifier and any additional conventional tackifiers and/or flame retardants, if present, is less than or equal to 25 percent by weight, preferably less than or equal to 20 percent by weight, and more preferably less than or equal to 15 percent by weight, based on the total weight of the PSA composition.

PSA compositions according to the present disclosure can be made according to well-known techniques used for manufacture of pressure-sensitive adhesives. Mixing can be done by a wide variety of methods that result in a substantially homogeneous distribution of the components. This can include dispersive mixing, distributive mixing, or a combination thereof. Both batch and continuous methods of mixing can be used.

PSA compositions according to the present disclosure may be crosslinked if desired. Crosslinking can be achieved using high energy electromagnetic radiation such as γ-radiation or e-beam radiation, for example. Alternatively, crosslinking can be achieved using a crosslinking agent such as a sulfur, a sulfur-donor, or peroxide curing systems traditionally used for crosslinking unsaturated rubbers. Other means of crosslinking include the use of reactive phenolic resins in combination with a metal catalyst, or the use of a multifunctional acrylate with a photoinitiator and ultraviolet light. Various combinations of crosslinking agents can also be employed. Preferably, the components are combined prior to crosslinking, if crosslinking is performed.

PSA compositions of the present disclosure can be applied to a substrate by a variety of coating methods including, for example, roll coating, spraying, and gravure coating. The thickness of the layer of adhesive may vary over a broad range; for example, from about 10 microns to several hundred microns.

Substrates (i.e., backings) on which the PSA compositions can be disposed include, for example, fabrics, metallized films and foils, polymeric films, nonwoven polymeric materials, paper, and foam backings. Examples of polymeric films include polyolefins such as polypropylene, polyethylene, low density polyethylene, linear low density polyethylene and high density polyethylene, polyesters, polycarbonates, cellulose acetates, and polyimides. Examples of nonwovens include nylon, polypropylene, ethylene-vinyl acetate, and polyurethane nonwovens. Examples of foam backings include acrylic, silicone, polyurethane, polyethylene, polypropylene, and neoprene rubber foam backings. The substrates can be layered or made of composite materials, if desired.

Once the PSA composition has been coated on the substrate, and optionally crosslinked, the adhesive surface of the article may, optionally, be protected with a temporary, removable release liner (i.e., protective liner) such as a polyolefin (e.g., polyethylene or polypropylene) or polyester (e.g., polyethylene terephthalate) film, or a plastic film. Such films may be treated with a release material such as silicones, waxes, fluorocarbons, and the like.

The PSA compositions of the present disclosure can be used in a wide variety of adhesive articles, including medical tapes, sealing tapes, electrical tapes, repositionable tapes, die-cut graphics, wall decoration films, and particularly in removable tapes, such as masking tapes, sheets, and drapes.

In addition to the PSA compositions described above, flame retardant tackifiers according to the present disclosure may be included in curable compositions to impart flame retardancy. In such cases, the curable composition comprises a curable binder precursor and a flame retardant tackifier represented by Formula II, discussed above.

The curable binder precursor curable binder precursor is a compound or composition that is capable of curing (i.e., chemically crosslinking) to form a covalently crosslinked network of bonds.

Useful curable binder precursors include, for example, phenolic resins, epoxy resins, polyester resins, co-polyester resins, polyurethane resins, polyamide resins, and mixtures thereof. Useful temperature-activated thermosetting materials include, for example, formaldehyde-containing resins such as novolac phenolics and resole phenolics and especially those with added crosslinking agent (e.g., hexamethylenetetramine), phenoplasts, and aminoplasts; unsaturated polyester resins; vinyl ester resins; alkyd resins, allyl resins; furan resins; epoxy resins; one- and two-part curable polyurethanes; cyanate esters; and polyimides. Preferably, the curable resin is selected from the group consisting of curable epoxy resins and curable acrylic resins.

One or more optional curatives such as, for example, free-radical thermal initiators, photoinitiators, catalysts, or other crosslinking agents may be included in the curable composition to facilitate curing. Curing may be spontaneous upon mixing, or it may be caused by application of energy (e.g., by heating and/or electromagnetic radiation). Curing conditions will typically depend on the curable binder precursor and curatives (if any) that may be present.

Exemplary epoxy resins include glycidyl ethers of bisphenol A, bisphenol F, and novolac resins as well as glycidyl ethers of aliphatic or cycloaliphatic diols. Examples of commercially available glycidyl ethers include diglycidyl ethers of bisphenol A such as those available as EPON 828, EPON 1001, EPON 1310, and EPON 1510 from Hexion Specialty Chemicals GmbH, Rosbach, Germany; those available under the trade name D.E.R. (e.g., D.E.R. 331, 332, and 334) from Dow Chemical Co., Midland, Mich.; those available under the trade name EPICLON from Dainippon Ink and Chemicals, Inc. (e.g., EPICLON 840 and 850) and those available under the trade name YL-980 from Japan Epoxy Resins Co., Ltd.); diglycidyl ethers of bisphenol F (e.g., those available under the trade name EPICLON from Dainippon Ink and Chemicals, Inc. (e.g., EPICLON 830)); glycidyl ethers of novolac resins (e.g., novolac epoxy resins, such as those available under the trade name D.E.N. from Dow Chemical Co. (e.g., D.E.N. 425, 431, and 438)); and flame retardant epoxy resins (e.g., D.E.R. 580, a brominated bisphenol type epoxy resin available from Dow Chemical Co.). In some embodiments, aromatic glycidyl ethers, such as those prepared by reacting a dihydric phenol with an excess of epichlorohydrin, may be preferred. In some embodiments, nitrile rubber modified epoxies may be used (e.g., KELPDXY 1341 available from CVC Chemical).

Exemplary curable acrylic resins include mixtures of mono- and or polyfunctional (meth)acrylates (i.e., (meth)acrylates having two or more (meth)acrylate groups). Useful mono(meth)acrylates include hexyl (meth)acrylate, 2-ethylhexyl acrylate, isononyl (meth)acrylate, isobornyl (meth)acrylate, phenoxyethyl (meth)acrylate, 2-hydroxyethyl (meth)acrylate, dodecyl (meth)acrylate, methyl (meth)acrylate, ethyl (meth)acrylate, nonbornyl (meth)acrylate, phenoxyethyl (meth)acrylate, and tetrahydrofurfuryl (meth)acrylate).

Useful poly(meth)acrylates include monomers and/or oligomers that have at least two (meth)acrylate groups; for example, tri(meth)acrylates, and tetra(methacrylates). Exemplary poly(methacrylates) include: di(meth)acrylates such as, for example, 1,3-butylene glycol di(meth)acrylate, 1,4-butanediol di(meth)acrylate, 1,6-hexanediol di(meth)acrylate, 1,6-hexanediol mono(meth)acrylate, ethylene glycol di(meth)acrylate, alkoxylated aliphatic di(meth)acrylate, alkoxylated cyclohexanedimethanol di(meth)acrylate, alkoxylated hexanediol di(meth)acrylate, alkoxylated neopentyl glycol di(meth)acrylate, caprolactone modified neopentyl glycol hydroxypivalate di(meth)acrylate, caprolactone modified neopentyl glycol hydroxypivalate di(meth)acrylate, cyclohexanedimethanol di(meth)acrylate, diethylene glycol di(meth)acrylate, dipropylene glycol di(meth)acrylate, ethoxylated (10) bisphenol A di(meth)acrylate, ethoxylated (3) bisphenol A di(meth)acrylate, ethoxylated (30) bisphenol A di(meth)acrylate, ethoxylated (4) bisphenol A di(meth)acrylate, hydroxypivalaldehyde-modified trimethylolpropane di(meth)acrylate, neopentyl glycol di(meth)acrylate, polyethylene glycol (200) di(meth)acrylate, polyethylene glycol (400) di(meth)acrylate, polyethylene glycol (600) di(meth)acrylate, propoxylated neopentyl glycol di(meth)acrylate, tetraethylene glycol di(meth)acrylate, tricyclodecanedimethanol di(meth)acrylate, triethylene glycol di(meth)acrylate, tripropylene glycol di(meth)acrylate; tri(meth)(meth)acrylates such as glycerol tri(meth)acrylate, trimethylolpropane tri(meth)acrylate, ethoxylated tri(meth)acrylates (e.g., ethoxylated (3) trimethylolpropane tri(meth)acrylate, ethoxylated (6) trimethylolpropane tri(meth)acrylate, ethoxylated (9) trimethylolpropane tri(meth)acrylate, ethoxylated (20) trimethylolpropane tri(meth)acrylate), pentaerythritol tri(meth)acrylate, propoxylated tri(meth)acrylates (e.g., propoxylated (3) glyceryl tri(meth)acrylate, propoxylated (5.5) glyceryl tri(meth)acrylate, propoxylated (3) trimethylolpropane tri(meth)acrylate, propoxylated (6) trimethylolpropane tri(meth)acrylate), trimethylolpropane tri(meth)acrylate, tris(2-hydroxyethyl) isocyanurate tri(meth)acrylate; and higher functionality compounds such as ditrimethylolpropane tetra(meth)acrylate, dipentaerythritol penta(meth)acrylate, ethoxylated (4) pentaerythritol tetra(meth)acrylate, pentaerythritol tetra(meth)acrylate, caprolactone modified dipentaerythritol hexa(meth)acrylate; oligomeric (meth)acryl compounds such as, for example, polyester (meth)acrylates, epoxy (meth)acrylates; and combinations thereof. Such compounds are widely available from vendors such as, for example, Sartomer Co. of Exton, Pa.; UCB Chemicals Corporation of Smyrna, Ga.; and Aldrich Chemical Company of Milwaukee, Wis.

Non-(meth)acrylate ester free-radically polymerizable compounds may be combined with one or more of the foregoing (meth)acrylate ester monomers. Examples include acrylic acid, methacrylic acid, N-vinyl pyrollidone, N-vinylcaprolactam, N-vinylformamide, allyl esters, styrene and substituted styrenes, maleic acid, and fumaric acid.

Curable acrylic resins typically include an effective amount (e.g., an amount of from 0.1, 1, or 3 percent by weight, up to 5, 7, or even 10 percent by weight, or more) of a free-radical curing agent such as a thermal initiator or a photoinitiator.

Exemplary thermal initiators include azo compounds such as, for example, 2,2-azo-bisisobutyronitrile, dimethyl 2,2'-azobis(isobutyrate), azobis(diphenylmethane), 4,4'-azobis-(4-cyanopentanoic acid), (2,2'-azobis(2,4-dimethylvaleronitrile (available as VAZO 52 from E. I. du Pont de Nemours and Co. of Wilmington, Del.); peroxides such as, for example, benzoyl peroxide, cumyl peroxide, tert-butyl peroxide, cyclohexanone peroxide, glutaric acid peroxide, and dilauryl peroxide; hydrogen peroxide; hydroperoxides such as, for example, tert-butyl hydroperoxide and cumene hydroperoxide; peracids such as, for example, peracetic acid and perbenzoic acid; potassium persulfate; and peresters such as, for example, diisopropyl percarbonate.

Exemplary useful photoinitiators include those known as useful for free-radically photocuring (meth)acrylates. Exemplary photoinitiators include benzoin and its derivatives such as α-methylbenzoin; α-phenylbenzoin; α-allylbenzoin; α-benzylbenzoin; benzoin ethers such as benzil dimethyl ketal (available as IRGACURE 651 from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (available as DAROCUR 1173 from Ciba Specialty Chemicals) and 1-hydroxycyclohexyl phenyl ketone (available as IRGACURE 184 from Ciba Specialty Chemicals); 2-methyl-1-[4-(methylthio)phenyl]-2-(4-morpholinyl)-1-propanone (available as IRGACURE 907 from Ciba Specialty Chemicals); 2-benzyl-2-(dimethylamino)-1-[4-(4-morpholinyl)phenyl]-1-butanone (available as IRGACURE 369 from Ciba Specialty Chemicals); and phenyl bis(2,4,6-trimethylbenzoyl)phosphine oxide (available as IRGACURE 819 from Ciba Specialty Chemicals. Other useful photoinitiators include mono- and bis-acylphosphines (available, for example, from Ciba Specialty Chemicals as IRGACURE 1700, IRGACURE 1800, IRGACURE 1850, and DAROCUR 4265).

Curable compositions according to the present disclosure may be used, for example, as thermosetting adhesive; particularly for use in applications such as electronic devices where fire resistance may be important. Examples of electronics uses include use as potting compounds, in circuit board fabrication, protective insulating coatings, and as adhesives for semiconductor die mounting.

SELECT EMBODIMENTS OF THE PRESENT DISCLOSURE

In a first embodiment, the present disclosure provides a pressure-sensitive adhesive composition comprising:
an elastomer; and
at least one flame retardant tackifier compound represented by the formula

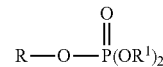

wherein
R represents a hydrocarbyl group having 20 carbon atoms and three consecutive fused six-membered rings; and
each R' independently represents an alkyl or aryl group having from 1 to 8 carbon atoms.

In a second embodiment, the present disclosure provides a pressure-sensitive adhesive composition according to the first embodiment, wherein the at least one flame retardant tackifier compound comprises at least one compound represented by the formula

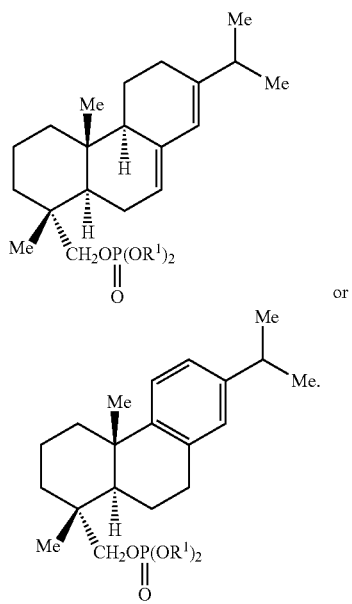

or

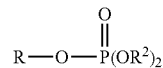

In a third embodiment, the present disclosure provides a pressure-sensitive adhesive composition according to the first or second embodiment, wherein the elastomer has a glass transition temperature of less than or equal to zero degrees Celsius.

In a fourth embodiment, the present disclosure provides a pressure-sensitive adhesive composition according to any one of the first to third embodiments, wherein said at least one elastomer is selected from the group consisting of natural rubber elastomers, acrylic elastomers, styrene-diene block copolymer elastomers, polybutadiene elastomers, α-olefin elastomers, polyisobutylene elastomers, and combinations thereof.

In a fifth embodiment, the present disclosure provides a pressure-sensitive adhesive composition according to any one of the first to fourth embodiments, wherein each $R^1$ is independently selected from the group consisting of phenyl groups and alkyl groups having from 1 to 6 carbon atoms.

In a sixth embodiment, the present disclosure provides a pressure-sensitive adhesive composition according to any one of the first to fifth embodiments, wherein each $R^1$ independently represents an alkyl group having from 1 to 4 carbon atoms.

In a seventh embodiment, the present disclosure provides a pressure-sensitive adhesive composition according to any one of the first to fifth embodiments, wherein each $R^1$ independently represents methyl, ethyl, or propyl.

In an eighth embodiment, the present disclosure provides a pressure-sensitive adhesive composition according to any one of the first to seventh embodiments, wherein the total combined amount of: the at least one flame retardant tackifier; any additional tackifier, if present; and any additional flame retardant, if present, is less than or equal to 25 percent by weight, based on the total weight of the pressure-sensitive adhesive composition.

In a ninth embodiment, the present disclosure provides a pressure-sensitive adhesive composition according to any one of the first to eighth embodiments, wherein the pressure-sensitive adhesive composition is substantially free of additional tackifier.

In a tenth embodiment, the present disclosure provides a pressure-sensitive adhesive composition according to any one of the first to ninth embodiments, wherein the pressure-sensitive adhesive composition is substantially free of additional flame retardant.

In an eleventh embodiment, the present disclosure provides a flame retardant tackifier represented by the formula $$R-O-\overset{O}{\underset{\|}{P}}(OR^2)_2$$

wherein
R represents a hydrocarbyl group having 20 carbons and three consecutive fused six-membered rings; and
each $R^2$ independently represents an alkyl group having from 1 to 8 carbon atoms.

In a twelfth embodiment, the present disclosure provides a flame retardant tackifier according to the eleventh embodiment, wherein the at least one flame retardant tackifier comprises at least one compound represented by the formula

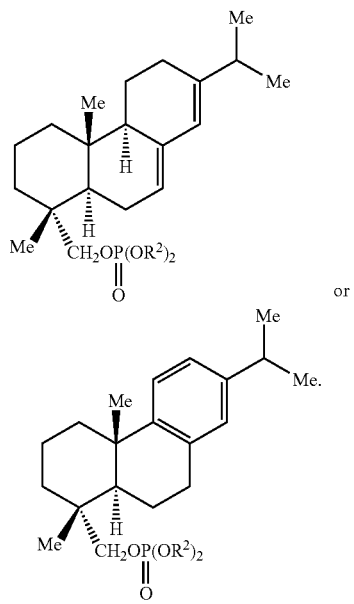

In a thirteenth embodiment, the present disclosure provides a flame retardant tackifier according to the eleventh or twelfth embodiment, wherein each $R^2$ independently represents an alkyl group having from 1 to 4 carbon atoms.

In a fourteenth embodiment, the present disclosure provides a flame retardant tackifier according to the eleventh or twelfth embodiment, wherein each $R^2$ independently represents methyl, ethyl, or propyl.

In a fifteenth embodiment, the present disclosure provides a curable composition comprising:
a curable binder precursor; and
a flame retardant tackifier represented by the formula

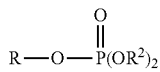

wherein
R represents a hydrocarbyl group having 20 carbon atoms and three consecutive fused six-membered rings; and
each $R^2$ independently represents an alkyl group having from 1 to 8 carbon atoms.

In a sixteenth embodiment, the present disclosure provides a curable composition according to the fifteenth embodiment, wherein the at least one flame retardant tackifier comprises at least one compound represented by the formula

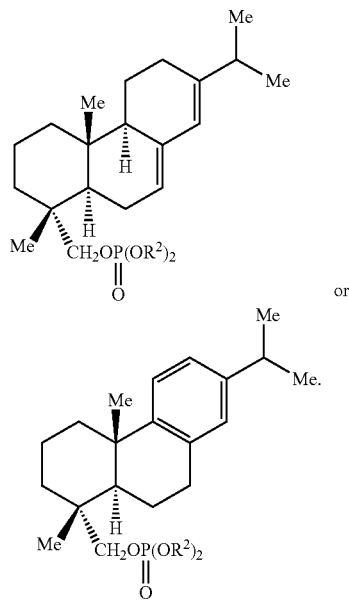

In a seventeenth embodiment, the present disclosure provides a curable composition according to the fifteenth or sixteenth embodiment, wherein the curable binder precursor is selected from the group consisting of curable epoxy resins and curable acrylic resins.

In an eighteenth embodiment, the present disclosure provides a curable composition according to any one of the fifteenth to seventeenth embodiments, wherein each $R^2$ independently represents an alkyl group having from 1 to 6 carbon atoms.

In a nineteenth embodiment, the present disclosure provides a curable composition according to any one of the fifteenth to seventeenth embodiments, wherein each $R^2$ independently represents an alkyl group having from 1 to 4 carbon atoms.

In a twentieth embodiment, the present disclosure provides a curable composition according to any one of the fifteenth to seventeenth embodiments, wherein each $R^2$ independently represents methyl, ethyl, or propyl.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Test Methods

Peel Adhesion Test

The Peel Adhesion Test measures the force required to peel from a substrate at an angle of 180 degrees. The test was performed on conditioned tapes prepared in the examples using the procedure described in ASTM D3330/D3330M-04 "Standard Test Method for Peel Adhesion of Pressure-Sensitive Tape" using the substrates described below.

A test specimen was prepared by adhering a 0.5 inch (1.3 cm) wide tape to a stainless steel plate and rolling over the tape once with a 2 kg roller onto the tape. The tape was tested on a peel tester at a plate speed of 12 inches/minute (30.5 cm/min). Replicate specimens were tested for each example, and averaged values were recorded.

UL510 Burn Test

Specimens were tested according to the Underwriters Laboratories test method UL510 flame test. Tape specimens were wrapped on a steel rod and then subjected to 15 seconds of burning for 5 times. To pass, a specimen had to meet the following criteria: 1) it should not flame more than 60 seconds; 2) no flaming dripping should be observed; and 3) the Kraft-paper flag placed near the top of the rod should not catch fire.

Microscale Combustion Calorimetry (MCC) Test

Specimens were evaluated using Microscale Combustion calorimetry (MCC) following the ASTM D7309-07 "Standard Test Method for Determining Flammability Characteristics of Plastics and Other Solid Materials Using Microscale Combustion calorimetry", Method A protocol. The instrument used was a Govmark MCC model MCC-2 from The Govmark Organization, Farmingdale, N.Y. The general method involves heating a 1-5 mg sample at a rate of 1° K/second in a nitrogen environment. The decomposition products were fully oxidized in a combustion chamber held at 900° C. in a 20% oxygen and 80% nitrogen environment. The heat release of the decomposition gases is determined from the mass of oxygen used to completely combust the sample. Three runs for each sample were evaluated and the results averaged. The following parameters were calculated from the data. Heat release capacity $\eta_c$ (J/g-° K) (HRC) is the maximum specific heat release rate divided by the heating rate. Maximum specific heat release $Q_{max}$ (W/g)—the maximum value over the temperature range. Heat release temperature (° K) is the temperature of the maximum specific heat release (Max T). Specific heat release $h_c$ (kJ/g) is the net heat release over the entire temperature range (Total HR).

Cone Calorimetry Test

Specimens were evaluated using Cone calorimetry following the ASTM E1354 "Standard Test Method for Heat and Visible Smoke Release Rates for Materials and Products Using an Oxygen Consumption calorimeter" protocol. Cone calorimeters measure the combustion and flame retardant properties of small amounts of condensed phase samples. Properties measured include: total heat release per unit area of sample; average and peak heat release rate (HRR) per unit area of sample; and Time to Peak HRR. The characteristic property FIGRA (Fire Growth Rate) is computed as the Peak HRR divided by the time to reach the Peak HRR.

Materials

The following materials were used in the examples that follow.

PSA1 an approximately 26 weight percent solids stock solution of a 98:2 isooctyl acrylate/acrylic acid (wt./wt.) pressure-sensitive acrylic polymer in ethyl acetate solvent, with additive; prepared generally according to procedure described in U.S. Pat. No. 7,166,686 (Olson et al.) in col. 14, lines 38-53.

PSA2 a styrene-butadiene block polymer hot melt adhesive available as HL-2697-PT from HB Fuller, St. Paul, Minn.

OP935 EXOLIT OP 935 organic phosphinate flame retardant powder available from Clariant International, Muttenz, Switzerland.

Abietic acid abietic acid, technical, ~75% (GC), from Sigma-Aldrich, Saint Louis, Mo.

EPOXY1 a curable two-part, epoxy insulating and encapsulating resin available as 3M SCOTCHCAST ELECTRICAL INSULATING RESIN 4 from 3M Company, Saint Paul, Minn.

Example 1

This example describes the synthesis of diethyl abietyl phosphate (ABP1), shown below.

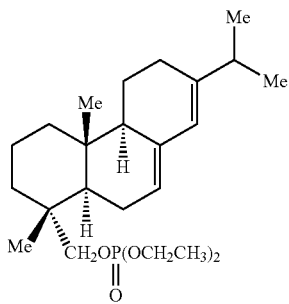

To a solution of 100.0 g (0.33 mol) of abietic acid in 400 mL of tetrahydrofuran (THF) at 0° C. was added 16.0 g (0.42 mol) of lithium aluminum hydride. The reaction mixture was stirred at 0° C. for 1 hour, and then heated at reflux for 5 hours. The mixture was poured into a mixture of ice and 3N HCl, the resulting mixture was extracted with diethyl ether, and the combined organic phases were washed with 1N HCl, saturated aqueous NaHCO$_3$, and saturated aqueous NaCl, and then dried over anhydrous MgSO$_4$. Filtration and concentration under reduced pressure provided 95.7 g of abietyl alcohol as a light yellow, tacky solid.

To a solution of this material in 200 mL of THF were added 101.2 g (1.00 mol) of triethylamine followed by 172.6 g (1.00 mol) of diethyl chlorophosphate, and the reaction mixture was heated at reflux for 18 hours. Additional charges of 65.8 g (0.65 mol) of triethylamine and 112.2 g (0.65 mol) of diethyl chlorophosphate were added, and the reaction mixture was heated at reflux for an additional 18 hours. Approximately half of the THF solvent was separated under reduced pressure, and the concentrate was poured into a mixture of water and 3N HCl. The resulting mixture was extracted with diethyl ether, and the combined organic phases were washed with 1N HCl, saturated aqueous NaHCO$_3$ and saturated aqueous NaCl and dried over anhydrous MgSO$_4$. Filtration and concentration provided an orange liquid. This material was adsorbed onto silica gel and eluted with hexanes followed by ethyl acetate. Concentration of the ethyl acetate eluent afforded 42.1 g of diethyl abietyl phosphate as a viscous orange oil.

Example 2

This example describes the synthesis of diethyl dehydroabietyl phosphate (ABP2), shown below.

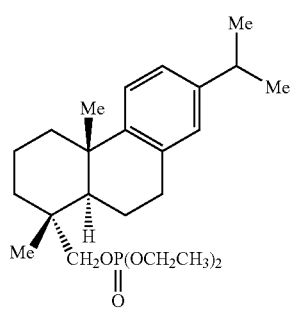

To a solution of 200.0 g (0.67 mol) of dehydroabietic acid in 600 mL of THF at 0° C. was added 33.5 g (0.89 mol) of lithium aluminum hydride. The reaction mixture was stirred at 0° C. for 1 hour, and then heated at reflux for 18 hours. The mixture was poured into a mixture of ice and 3N HCl, the resulting mixture was extracted with diethyl ether, and the combined organic phases were washed with 1N HCl, saturated aqueous NaHCO$_3$, and saturated aqueous NaCl, and then dried over anhydrous MgSO$_4$. Filtration and concentration under reduced pressure provided 188.5 g of dehydroabietyl alcohol as a plastic solid.

To a solution of this material in 400 mL of THF were added 331.9 g (3.28 mol) of triethylamine followed by 566.0 g (3.28 mol) of diethyl chlorophosphate, and the reaction mixture was heated at 70° C. for 18 hours. The mixture was poured into a mixture of ice and water. The resulting mixture was extracted with diethyl ether. The combined organic phases were washed with saturated aqueous NaCl, and then dried over anhydrous MgSO$_4$. Filtration and concentration afforded 92.6 g of diethyl dehydroabietyl phosphate as a viscous orange oil.

Examples 3 and Comparative Example A

PSA1 and ABP2 were combined with mixing in amounts as described in Table 1, and evaluated as to flame retardancy using the Cone calorimetry Test. Cone calorimetry Test and Peel Test results are reported in Tables 1 and 2, wherein each mixed composition was coated onto 1 mil (25.4 microns) thick polyethylene terephthalate film and dried, resulting in dry coating thickness as follows: Comparative Example A=21 microns; Example 3=18 microns. For the Cone calorimetry Test, samples of the coated film were stacked on top of each other to achieve a total thickness of 0.5 mm.

TABLE 1

| | PERCENT BY WEIGHT | | CONE CALORIMETRY TEST | | | | |
|---|---|---|---|---|---|---|---|
| | | | Total Heat Release, | Average HRR, | Peak HRR, | Time of Peak HRR, | FIGRA, |
| | PSA1 | ABP2 | MJ/m² | kW/m² | kW/m² | seconds | kW/m² sec |
| COMPARATIVE EXAMPLE A | 100 | 0 | 172.6 | 932.4 | 2235.6 | 130 | 17.2 |
| EXAMPLE 3 | 85 | 15 | 158.4 | 659.7 | 1531.7 | 130 | 11.7 |

TABLE 2

| | PERCENT BY WEIGHT | | PEEL ADHESION TEST | |
|---|---|---|---|---|
| | PSA1 | ABP2 | PEEL, oz/in (N/cm) | TACK, g |
| COMPARATIVE EXAMPLE A | 100 | 0 | 18.7 (2.05) | 352.3 |
| EXAMPLE 3 | 85 | 15 | 23.3 (2.55) | 410.3 |

Examples 4-6 and Comparative Examples B-D

Solvent-borne acrylic pressure-sensitive adhesive compositions were prepared by mixing components as described in Table 3 (below), coating them onto 1 mil (25.4 micron) thick polyethylene terephthalate film at a wet thickness of 100 microns, and allowing the solvent to evaporate at room temperature for 10 minutes, and then placed in oven at 110° C. for 10 minutes resulting in a dry thickness of 40 microns.

TABLE 3

| | PERCENT BY WEIGHT | | | | |
|---|---|---|---|---|---|
| | PSA1 | OP935 | Abietic acid | ABP1 | ABP2 |
| COMPARATIVE EXAMPLE B | 80 | 20 | 0 | 0 | 0 |
| COMPARATIVE EXAMPLE C | 70 | 20 | 10 | 0 | 0 |
| COMPARATIVE EXAMPLE D | 65 | 20 | 15 | 0 | 0 |
| EXAMPLE 4 | 70 | 20 | 0 | 10 | 0 |
| EXAMPLE 5 | 70 | 20 | 0 | 0 | 10 |
| EXAMPLE 6 | 65 | 20 | 0 | 0 | 15 |

TABLE 4

| | HORIZONTAL BURN TEST | VERTICAL BURN TEST | UL510 BURN TEST | |
|---|---|---|---|---|
| | | | 1 | 2 |
| COMPARATIVE EXAMPLE B | failed (barely) | pass | 0 | >60 (fail) |
| COMPARATIVE EXAMPLE C | failed | pass | 18 | >60 (fail) |
| COMPARATIVE EXAMPLE D | one pass, one fail | pass | 0 | >60 (fail) |
| EXAMPLE 4 | pass | pass | 0 | >60 (fail) |
| EXAMPLE 5 | pass | pass | 33 | >60 (fail) |
| EXAMPLE 6 | pass | pass | 0 | >60 (fail) |

TABLE 5

| | MICROSCALE COMBUSTION CALORIMETRY TEST | | |
|---|---|---|---|
| | HRC, J/g-° K | TOTAL HR, kJ/g | MAX T, ° K |
| COMPARATIVE EXAMPLE B | 734 | 25.3 | 411.0 |
| COMPARATIVE EXAMPLE C | 678 | 30.8 | 407.0 |
| COMPARATIVE EXAMPLE D | 579 | 29.8 | 409.3 |
| EXAMPLE 4 | 595 | 26.5 | 414.8 |
| EXAMPLE 5 | 624 | 29.3 | 411.5 |
| EXAMPLE 6 | 449 | 26.5 | 416.2 |

Example 7

Solvent-borne acrylic pressure-sensitive adhesive compositions were prepared by mixing 70 parts by weight of PSA1 with 30 parts by weight of ABP2, coating the mixture onto 1 mil (25.4 micron) thick polyethylene terephthalate film and allowing the solvent to evaporate resulting in a dry thickness of 40 microns. The resulting PSA-coated film failed the UL 510 test. The formulation did show elevated peel adhesion of 46 oz/in (5.03 N/cm).

Examples 8-9 and Comparative Examples E-F

PSA2 and abietic acid, ABP1, or ABP2 were combined with mixing in amounts as described in Table 6. Flame retardancy results are reported in Tables 7 and 8, wherein the mixed composition was coated onto 1-mil polyethylene terephthalate film at a wet film thickness of 100 microns, and dried, resulting in dry film thickness as follows: Example 8=40 microns; Example 9=40 microns; Comparative Example E=40 microns; Comparative Example F=40 microns.

TABLE 6

| | PERCENT BY WEIGHT | | | | |
|---|---|---|---|---|---|
| | PSA2 | Abietic Acid | ABP1 | ABP2 | ADHESIVE PROPERTIES |
| COMPARATIVE EXAMPLE E | 100 | 0 | 0 | 0 | NOT PSA |
| COMPARATIVE EXAMPLE F | 70 | 30 | 0 | 0 | PSA |
| EXAMPLE 7 | 70 | 0 | 30 | 0 | PSA |
| EXAMPLE 8 | 70 | 0 | 0 | 30 | PSA |

TABLE 7

| | MICROSCALE COMBUSTION CALORIMETRY TEST | | |
|---|---|---|---|
| | HRC, J/g-°K | TOTAL HR, kJ/g | MAX T, °C. |
| COMPARATIVE EXAMPLE E | 465 | 43.9 | 405 |
| COMPARATIVE EXAMPLE F | 323 | 41.4 | 407 |
| EXAMPLE 7 | 463 | 36.9 | 307 |
| EXAMPLE 8 | 639 | 40.4 | 317 |

TABLE 8

| | UL 510 BURN TEST | | | | | |
|---|---|---|---|---|---|---|
| | Burn Time, seconds Replicate | | | | | PASS/ FAIL |
| | 1 | 2 | 3 | 4 | 5 | |
| COMPARATIVE EXAMPLE F | 60 | — | — | — | — | fail |
| EXAMPLE 7 | 9 | 20 | 0 | 0 | 0 | pass |
| EXAMPLE 8 | 25 | flag | — | — | — | fail |

Example 9 and Comparative Example G

EPOXY1 and ABP2 were combined with mixing and allowed to cure in amounts indicated in Table 9, and then evaluated for Flame retardancy as described in Table 9 (below).

TABLE 9

| | | CONE CALORIMETRY TEST | | | | |
|---|---|---|---|---|---|---|
| | COMPOSITION | Total Heat Release, MJ/m² | Average HRR, kW/m² | Peak HRR, kW/m² | Time of Peak HRR, seconds | FIGRA, kW/m² sec |
| COMPARATIVE EXAMPLE G | EPOXY1 | 172.4 | 733.0 | 2202.6 | 160 | 13.8 |
| EXAMPLE 9 | 85 percent by weight EPOXY1/ 15 percent by weight ABP2 | 157.6 | 420.3 | 1088.7 | 35 | 31.1 |

All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A pressure-sensitive adhesive composition comprising:
   an elastomer; and
   at least one flame retardant tackifier compound represented by the formula

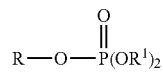

wherein
   R represents a hydrocarbyl group having 20 carbon atoms and three consecutive fused six-membered rings; and
   each $R^1$ independently represents an alkyl or aryl group having from 1 to 8 carbon atoms.

2. The pressure-sensitive adhesive composition of claim 1, wherein the at least one flame retardant tackifier compound comprises at least one compound represented by the formula

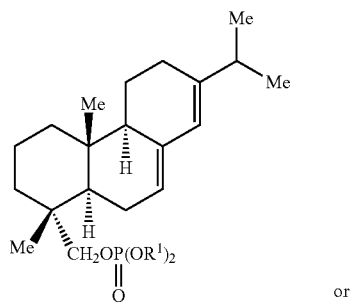

or

-continued

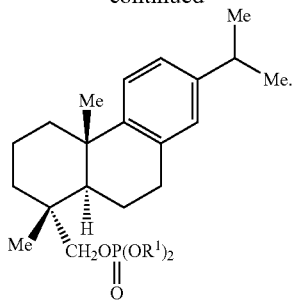

3. The pressure-sensitive adhesive composition of claim 1, wherein the elastomer has a glass transition temperature of less than or equal to zero degrees Celsius.

4. The pressure-sensitive adhesive composition of claim 1, wherein said at least one elastomer is selected from the group consisting of natural rubber elastomers, acrylic elastomers, styrene-diene block copolymer elastomers, polybutadiene elastomers, α-olefin elastomers, polyisobutylene elastomers, and combinations thereof.

5. The pressure-sensitive adhesive composition of claim 1, wherein each $R^1$ is independently selected from the group consisting of phenyl groups and alkyl groups having from 1 to 6 carbon atoms.

6. The pressure-sensitive adhesive composition of claim 1, wherein each $R^1$ independently represents an alkyl group having from 1 to 4 carbon atoms.

7. The pressure-sensitive adhesive composition of claim 1, wherein each $R^1$ independently represents methyl, ethyl, or propyl.

8. The pressure-sensitive adhesive composition of claim 1, wherein the total combined amount of:
   the at least one flame retardant tackifier;
   any additional tackifier, if present; and
   any additional flame retardant, if present,
is less than or equal to 25 percent by weight, based on the total weight of the pressure-sensitive adhesive composition.

9. The pressure-sensitive adhesive composition of claim 1, wherein the pressure-sensitive adhesive composition is substantially free of additional tackifier.

10. The pressure-sensitive adhesive composition claim 1, wherein the pressure-sensitive adhesive composition is substantially free of additional flame retardant.

11. A curable composition comprising:
   a curable binder precursor; and
   a flame retardant tackifier represented by the formula

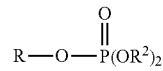

wherein
   R represents a hydrocarbyl group having 20 carbon atoms and three consecutive fused six-membered rings; and
   each $R^2$ independently represents an alkyl group having from 1 to 8 carbon atoms.

12. The curable composition of claim 11, wherein the at least one flame retardant tackifier comprises at least one compound represented by the formula

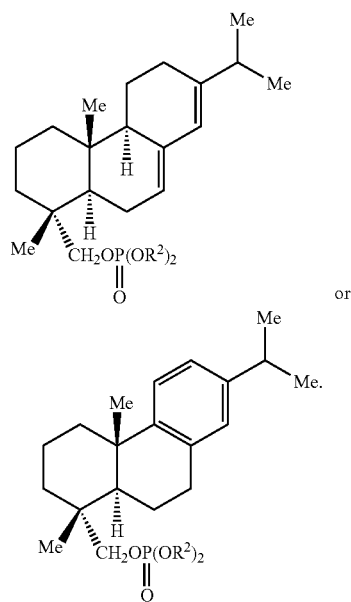

13. The curable composition of claim 11, wherein the curable binder precursor is selected from the group consisting of curable epoxy resins and curable acrylic resins.

14. The curable composition of claim 11, wherein each $R^2$ independently represents an alkyl group having from 1 to 6 carbon atoms.

15. The curable composition of claim 11, wherein each $R^2$ independently represents an alkyl group having from 1 to 4 carbon atoms.

16. The curable composition of claim 11, wherein each $R^2$ independently represents methyl, ethyl, or propyl.

* * * * *

UNITED STATES PATENT AND TRADEMARK OFFICE
CERTIFICATE OF CORRECTION

PATENT NO. : 9,926,473 B2
APPLICATION NO. : 15/128540
DATED : March 27, 2018
INVENTOR(S) : Richard Ross Page 1 of 1

It is certified that error appears in the above-identified patent and that said Letters Patent is hereby corrected as shown below:

In the Specification

Column 11
Line 4, Delete "R'" and insert -- $R^1$ --, therefor.

Column 14
Line 36, Delete "calorimetry" and insert -- Calorimetry --, therefor.

Column 14
Line 39, Delete "calorimetry"," and insert -- Calorimetry", --, therefor.

Column 14
Line 59, Delete "calorimetry" and insert -- Calorimetry --, therefor.

Column 14
Line 62, Delete "calorimeter"" and insert -- Calorimeter" --, therefor.

Column 16
Line 59, Delete "calorimetry" and insert -- Calorimetry --, therefor. (First Occurrence)

Column 16
Line 59, Delete "calorimetry" and insert -- Calorimetry --, therefor. (Second Occurrence)

Column 16
Lines 65-66 (Approx.), Delete "calorimetry" and insert -- Calorimetry --, therefor.

In the Claims

Column 21
Line 45, In Claim 10, after "composition" insert -- of --.

Signed and Sealed this
Eleventh Day of December, 2018

Andrei Iancu
*Director of the United States Patent and Trademark Office*